(12) United States Patent
Huang et al.

(10) Patent No.: US 6,986,492 B2
(45) Date of Patent: Jan. 17, 2006

(54) SUPPORT STRUCTURE OF A PORTABLE KEYBOARD

(75) Inventors: Chao-Ming Huang, Taipei (TW); Wen-Chieh Wang, Taipei (TW); Kao-Wen Chang, Taipei (TW)

(73) Assignee: Tatung Co., Ltd., Taipei (TW)

( * ) Notice: Subject to any disclaimer, the term of this patent is extended or adjusted under 35 U.S.C. 154(b) by 0 days.

(21) Appl. No.: 10/778,185

(22) Filed: Feb. 17, 2004

(65) Prior Publication Data

US 2004/0232302 A1    Nov. 25, 2004

(30) Foreign Application Priority Data

Mar. 10, 2003  (TW) ............................. 92203584 U

(51) Int. Cl.
   *A47B 91/00* (2006.01)
(52) U.S. Cl. ................. 248/346.03; 248/917; 248/918; 361/680; 361/681
(58) Field of Classification Search ........... 248/346.03, 248/346.04, 917, 918, 922, 442.2, 447; 361/680, 361/681, 683; 345/168, 169, 156; 400/680, 400/691, 718
See application file for complete search history.

(56) References Cited

U.S. PATENT DOCUMENTS

| | | | | |
|---|---|---|---|---|
| 5,085,394 A | * | 2/1992 | Torii | 248/455 |
| 5,255,214 A | * | 10/1993 | Ma | 361/680 |
| 5,307,281 A | * | 4/1994 | Wollmann | 705/407 |
| 5,496,972 A | * | 3/1996 | Demar et al. | 177/126 |
| 5,978,215 A | * | 11/1999 | Chiu et al. | 361/687 |
| 6,144,550 A | * | 11/2000 | Weber et al. | 361/681 |
| 6,194,671 B1 | * | 2/2001 | Vaghi | 177/25.15 |
| 6,430,038 B1 | * | 8/2002 | Helot et al. | 361/681 |
| 6,538,642 B2 | * | 3/2003 | Tsai | 345/168 |
| 6,700,775 B1 | * | 3/2004 | Chuang et al. | 361/680 |
| 6,798,649 B1 | * | 9/2004 | Olodort et al. | 361/683 |
| 6,803,904 B2 | * | 10/2004 | Furuki et al. | 345/168 |
| 2003/0017746 A1 | * | 1/2003 | Lee | 439/638 |

FOREIGN PATENT DOCUMENTS

| | | | |
|---|---|---|---|
| EP | 691603 A | * | 10/1998 |
| GB | 2386346 A | * | 9/2003 |

* cited by examiner

Primary Examiner—Korie Chan
(74) Attorney, Agent, or Firm—Bacon & Thomas PLLC

(57) ABSTRACT

A support structure of a portable keyboard includes two front support and a rear support. The front supports and the rear support can rotate to two predetermined angles respectively to form a confine within which a portable computer may be placed and supported. The rear support supports a backside of the portable computer, and the front supports push against a lower edge of the portable computer. Furthermore, both the front supports and the rear support can be closed onto an upper surface of the portable keyboard.

6 Claims, 4 Drawing Sheets

US 6,986,492 B2

SUPPORT STRUCTURE OF A PORTABLE KEYBOARD

BACKGROUND OF THE INVENTION

1. Field of the Invention

The present invention relates to a support structure of a portable keyboard and, more particularly, to a support structure that utilizes a front pivot and a rear pivot to place and support a portable computer on an upper surface of the portable keyboard.

2. Description of Related Art

Tablet PC(Personal Computer) typically offer several advantages, such as portability, powerful operating performance, extending ability, small size and light weight. However, when compared to a desktop PC, the tablet PC has simplified functions, which can be expanded by connecting the tablet computer to an extending base. Furthermore, when a user wants to use the tablet PC as a desktop PC, the user needs to find a support assembly to support the tablet PC. But an additional support assembly requires extra space, and not all support assemblies are capable of supporting a tablet PC at an ergonomically desirable angle, so the user must spend time to select a suitable support assembly.

Therefore, it is desirable to provide an improved support assembly to solve the aforementioned problems.

SUMMARY OF THE INVENTION

A main objective of the present invention is to provide a support assembly of a portable keyboard, which utilizes a simplified support assembly to support the portable computer quickly.

Another objective of the present invention is to provide a support assembly of a portable keyboard, which offers a lower failure rate and a smaller size.

In order to achieve the above-mentioned objectives, the present invention provides a support structure, which comprises a portable keyboard, having a keyboard set on an upper surface of the portable keyboard; at least one rear support pivotally mounted on the upper surface of the portable keyboard via a rear shaft, the at least one rear support capable of pivoting forward to close onto the upper surface and capable of pivoting backward to a first predetermined angle; and at least one front support pivotally mounted on the upper surface of the portable keyboard via a front shaft which located in front of the rear shaft, the at least one front support capable of pivoting backward to close onto the upper surface and capable of pivoting forward to a second predetermined angle; wherein when the at least one rear supports support pivots backward to the first predetermined angle and the at least one front supportsupport pivots forward to the second predetermined angle, a space is formed between the at least one rear supportsupport and the at least one front supportsupport for receiving a portable computer.

The portable computer of the present invention would be a tablet computer, a notebook, a webpad or any other equivalent portable computer. The first elastic unit would be a spring, an oil/gas pressure piston or other elastic force-providing device. The fastener would be a protuberance or other fastener force-providing device. The support assembly of the present invention not only can provide a support for a portable computer, but also can save the space because of it's smaller size.

Other objectives, advantages, and novel features of the invention will become more apparent from the following detailed description when taken in conjunction with the accompanying drawings.

DETAILED DESCRIPTION OF THE PREFERRED EMBODIMENT

Illustrative embodiments of the invention are described below. In the interest of clarity, not all features of an actual implementation are described in this specification.

Figure 1:
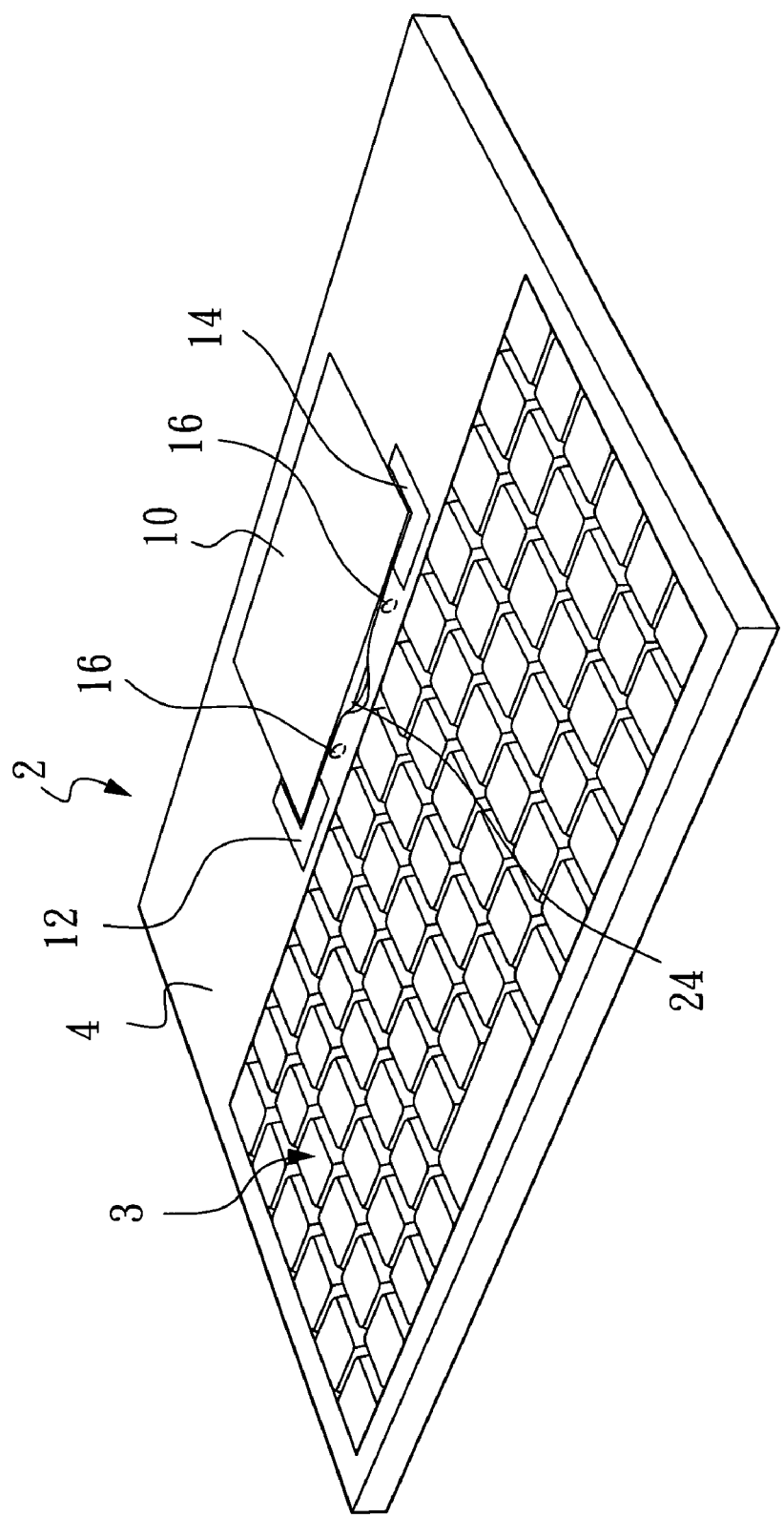
FIG. 1 is a front view of a support assembly for a portable keyboard according to the present invention.

Please refer to FIG. 1 to FIG. 5. An identical reference number represents an identical or similar element. FIG. 1 is a front view of a support structure for a portable keyboard, showing the support structure closed according to the present invention. An upper surface 4 of a portable keyboard 2 has a keyboard set 3, a rear support 10, a first front support 12 and a second front support 14. In this embodiment, the first front support 12 and the second support 14 are mounted closer to the keyboard set 3, which is taken as the front side; the rear support 10 is mounted farther away from the keyboard set 3, where is taken as the back side. In the other words, the first front support 12 and a second support 14 are mounted in front of the rear support 10.

Figure 2:
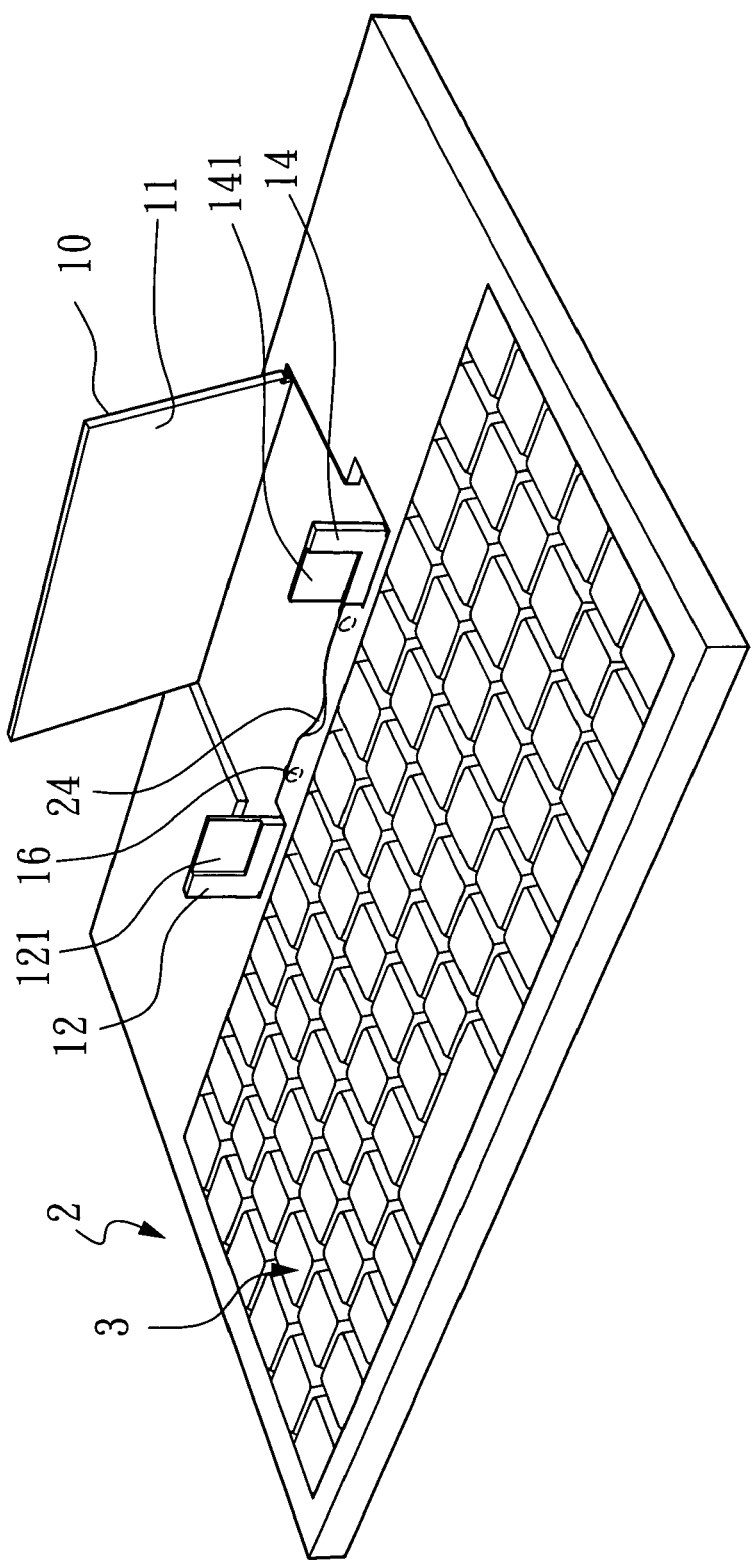
FIG. 2 is another front view of the support assembly for the portable keyboard according to the present invention.

As shown in FIG. 2, one end of the rear support 10 has a rear shaft 22 mounted on the upper surface 4 of a portable keyboard 2, so the rear support 10 can be pivotally mounted on the upper surface 4. One end of the first front support 12 has a first front shaft 18 which has a first upper indentation 121 thereon. One end of the second front support 14 has a second front shaft 19 which has a second upper indentation 141 thereon. The first front support 12 and the second front support 14 are both pivotally mounted on the upper surface 4 of a portable keyboard 2 near the keyboard set 3 via the first front shaft 18 and second front shaft 19, and can be closed onto the upper surface 14 by appropriately rotating the first front shaft 18 and second front shaft 19. When the first front support 12, second front support 14 and the rear support 10 are all closed onto the upper surface 4 of the portable keyboard 2, a lower surface 11 of the rear support 10 is disposed within the first upper indentation 121 and the second upper indentation 141. The length of the rear support 10 is longer than both the first front support 12 and the second front support 14.

The upper surface 4 of the portable keyboard 2 further comprises a protuberance 16, as shown in FIG. 1. When the first front support 12, second front support 14 and the rear support 10 are all closed onto the upper surface 4 of the portable keyboard 2, the protuberance 16 can provide a fastening force for the rear support 10. The protuberance would be replaced with other fastener force-providing device.

Figure 3:
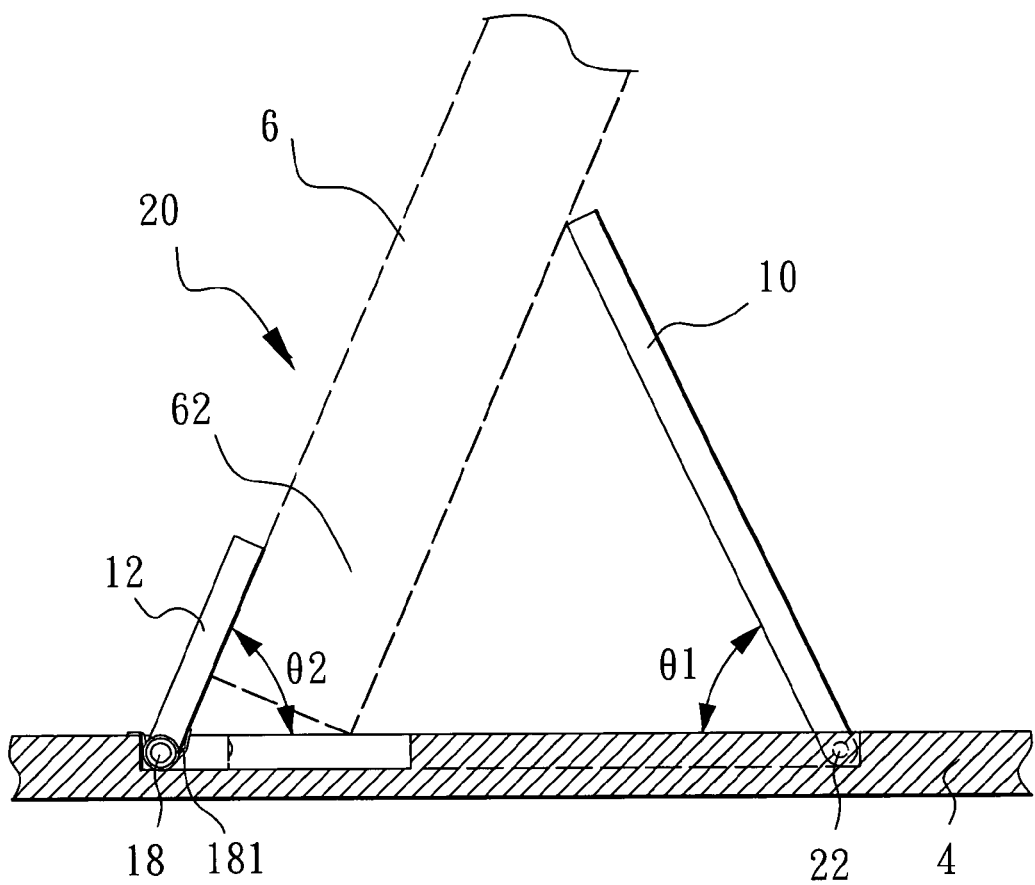
FIG. 3 is a schematic drawing showing how to open the support structure for the portable keyboard according to the present invention.

As shown in FIG. 3, the rear support 10 can be opened by rotating the rear shaft 22 backward, and the rear support 10 rotates from an original horizontal state (the closed state) to a predetermined angle $\theta_1$, such as 60°. Furthermore, the first front support 12 can be opened by rotating the first front shaft 18 backwards, and the first front support 12 rotates from an original horizontal state (the closed state) to a predetermined angle $\theta_2$, such as 60°. The second front support 12 can be operated in the same manner as the first front pivot 12, and so requires no more explanation. A confine 20 is formed between the rear support 10, the first front support 12 and second front support 14, and the tablet computer 6 can be placed within the confine 20. The rear support 10 supports a backside 61 of the tablet computer 6, and the first front support 12 and second front support 14 push against a lower edge 62 of the tablet computer 6.

The upper surface 4 of the portable keyboard 2 further comprises an indentation 24, as shown in FIG. 1. When the rear support 10 is opened, a user's finger may be inserted into the indentation 24 to press, and thereby release the rear support 10.

Figure 4:
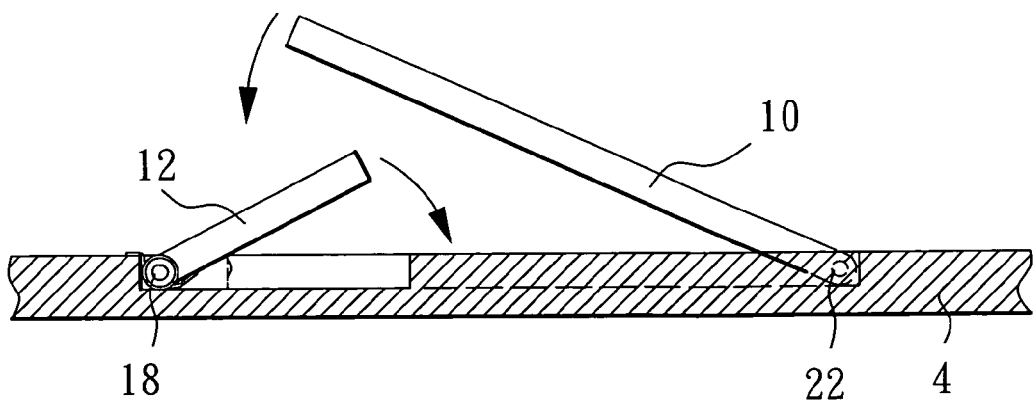
FIG. 4 is a schematic drawing showing how to close the support structure for the portable keyboard according to the present invention.

As shown in FIG. 4, if no tablet computer 6 is to be placed within the confine 20, in order to close the rear support 10, the first front support 12 and second front support 14, the rear shaft 22 is pivoted forward to close the rear support 10. The rear support 10 rotates from the predetermined angle $\theta_1$ to the upper surface 4. However, during the closing of the rear pivot 10, since the rear support 10 is longer than the first front support 12 and second front support 14, the first front support 12 and second front support 14 are pressed by the lower surface 11 of the rear support 10, so the first front shaft 18 and second front shaft 19 are pivoted from the predetermined angle θ1 to the upper surface 4 until the rear support 10, thefirst front support 12 and second front support 14 are closed to the upper surface 4. The portable would be a tablet computer, a notebook, a webpad or any other equivalent portable computer.

An elastic device can be utilized to help rotate the rear support 10, the first front support 12 and second front support 14. For example, a rear spring 221 may be mounted on the rear shaft 22. When the rear support 10 is opened, the rear spring 221 provides a predetermined elasticity to the rear support 10, and so the rear support 10 rotates quickly to the predetermined angle $\theta_1$. A first front spring 181 may be mounted on the first front pivot 18, and when the first front support 12 is opened, the first front spring 181 provides a predetermined elasticity to the first front support 12, causing the first front pivot 12 to rotate quickly to the predetermined angle $\theta_2$. Similarly, a second front spring 191 may be mounted on the second front pivot 19, and when the second front support 12 is opened, the second front spring 181 provides a predetermined elasticity to the second front support 14. The elastic unit would be replaced with an oil/gas pressure piston or other elastic force-providing device.

Figure 5:
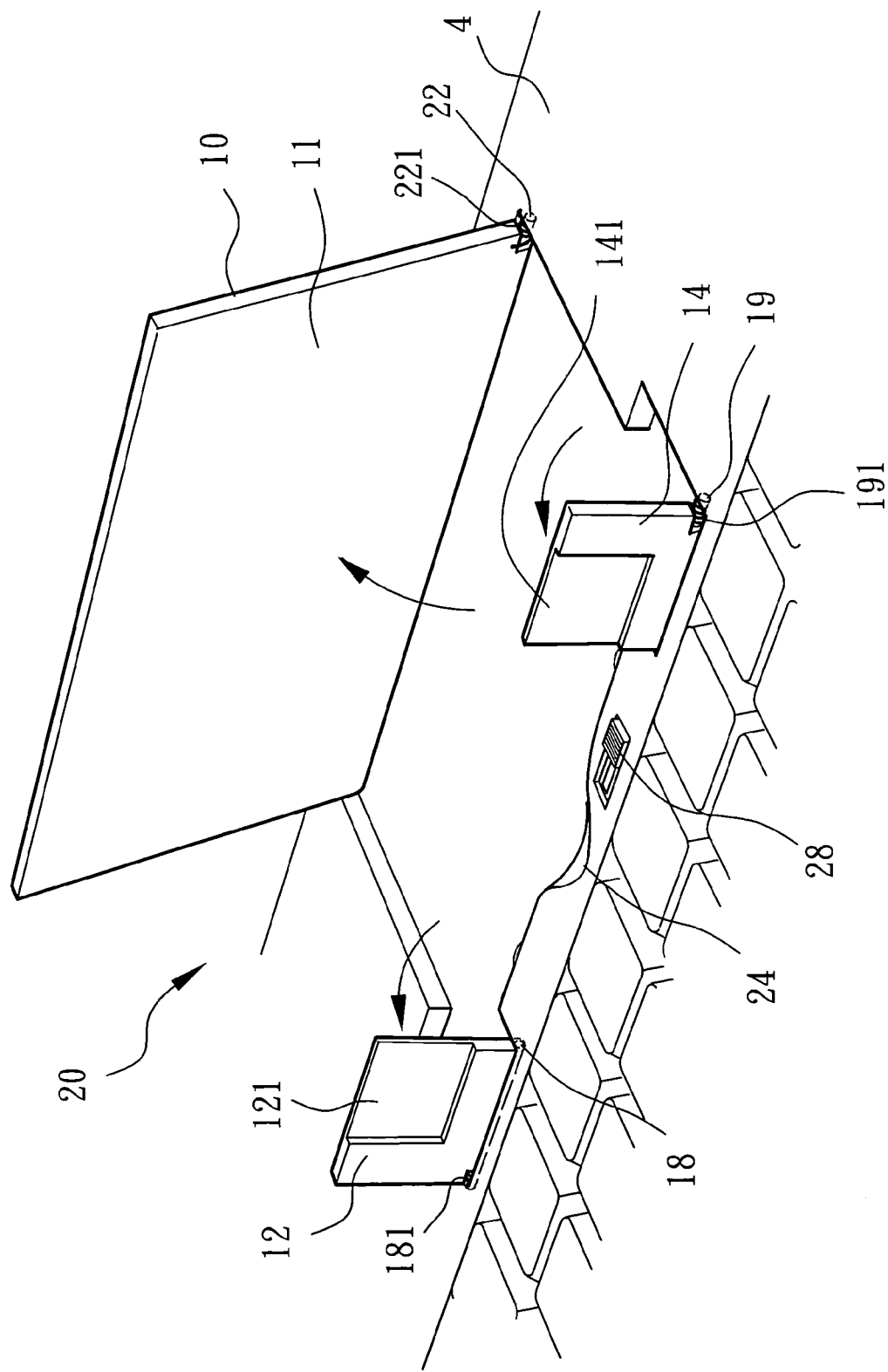
FIG. 5 is a front view of a support structure for the portable keyboard with a slidable button according to the present invention.

In addition, the upper surface 4 of the portable keyboard 2 further comprises a slidable button 28, as shown in FIG. 5. The slidable button 28 is used to help the rear support 10, the first front support 12 and second front support 14 to open and close. A tenon (not shown in drawing) is mounted on the slidable button 28, and when the rear support 10 is closed, the tenon fastens the rear support 10 on the upper surface 4 of the portable keyboard 2. When the slidable button 28 is pushed, the tenon releases the rear support 10 to rotate backward, and the first front support 12 and second front support 14 move forward.

As shown in FIG. 3, when the tablet computer 6 is placed in the confine 20, since the size of the confine 20 is larger than a width of the tablet computer 6, the tablet computer 6 can be placed in the containing space 20 at an inclined angle that is ergonomically desirable.

The support structure of the present invention not only can provide a simplified support method for a portable computer, enabling rapid opening and closing of the portable computer, but can also reduce space requirements by being attached to the portable computer.

The invention has been described using exemplary preferred embodiments. However, for those skilled in this field the preferred embodiments can be easily adapted and modified to suit additional applications without departing from the spirit and scope of this invention. Thus, it is to be understood that the scope of the invention is not limited to the disclosed embodiments. On the contrary, it is intended to cover various modifications and similar arrangements based upon the same operating principle. The scope of the claims, therefore, should be accorded the broadest interpretations so as to encompass all such modifications and similar arrangements.

Although the present invention has been explained in relation to its preferred embodiment, it is to be understood that many other possible modifications and variations can be made without departing from the spirit and scope of the invention as hereinafter claimed.

What is claimed is:

1. A support structure of a portable keyboard, comprising:
   a portable keyboard, having a keyboard set on an upper surface of the portable keyboard;
   at least one rear support pivotally mounted on the upper surface of the portable keyboard via a rear shaft, the at least one rear support capable of pivoting forward to close onto the upper surface and capable of pivoting backward to a first predetermined angle; and
   at least one front support pivotally mounted on the upper surface of the portable keyboard via a front shaft which located in front of the rear shaft, the at least one front support capable of pivoting backward to close onto the upper surface and capable of pivoting forward to a second predetermined angle, wherein the length of the at least one rear support is longer than that of the at least one front support, and the at least one front support comprises an upper indentation;
   wherein when the at least one rear support pivots backward to the first predetermined angle and the at least one front support pivots forward to the second predetermined angle, and a space is formed between the at least one rear support and the at least one front support for receiving a portable computer;
   wherein when the at least one rear support pivots forward, the at least one rear support is engaged into the upper indentation of the at least one front support and pushes the at least one front support to close onto the upper surface of the portable keyboard.

2. The support structure as claimed in claim 1 wherein the at least one rear support further comprises at least one elastic unit for providing a predetermined elasticity to pivot the at least one rear support backward to the first predetermined angle.

3. The support structure as claimed in claim 1 wherein the at least one front support further comprises at least one elastic unit for providing a predetermined elasticity to pivot the at least one front support to the second predetermined angle.

4. The support structure as claimed in claim 1 wherein the upper surface of the portable keyboard further comprises a fastener for fastening the at least one rear support on the upper surface of the portable keyboard.

5. The support structure as claimed in claim 1 wherein the upper surface of the portable keyboard further comprises a slidable fastener, for fastening the at least one rear support so that the at least one front support and the at least one rear support are capable of being closed together on the upper surface of the portable keyboard.

6. The support structure as claimed in claim 1 wherein the portable computer is selected from a group of a tablet computer, a notebook, and a webpad.

* * * * *